Figure 1:
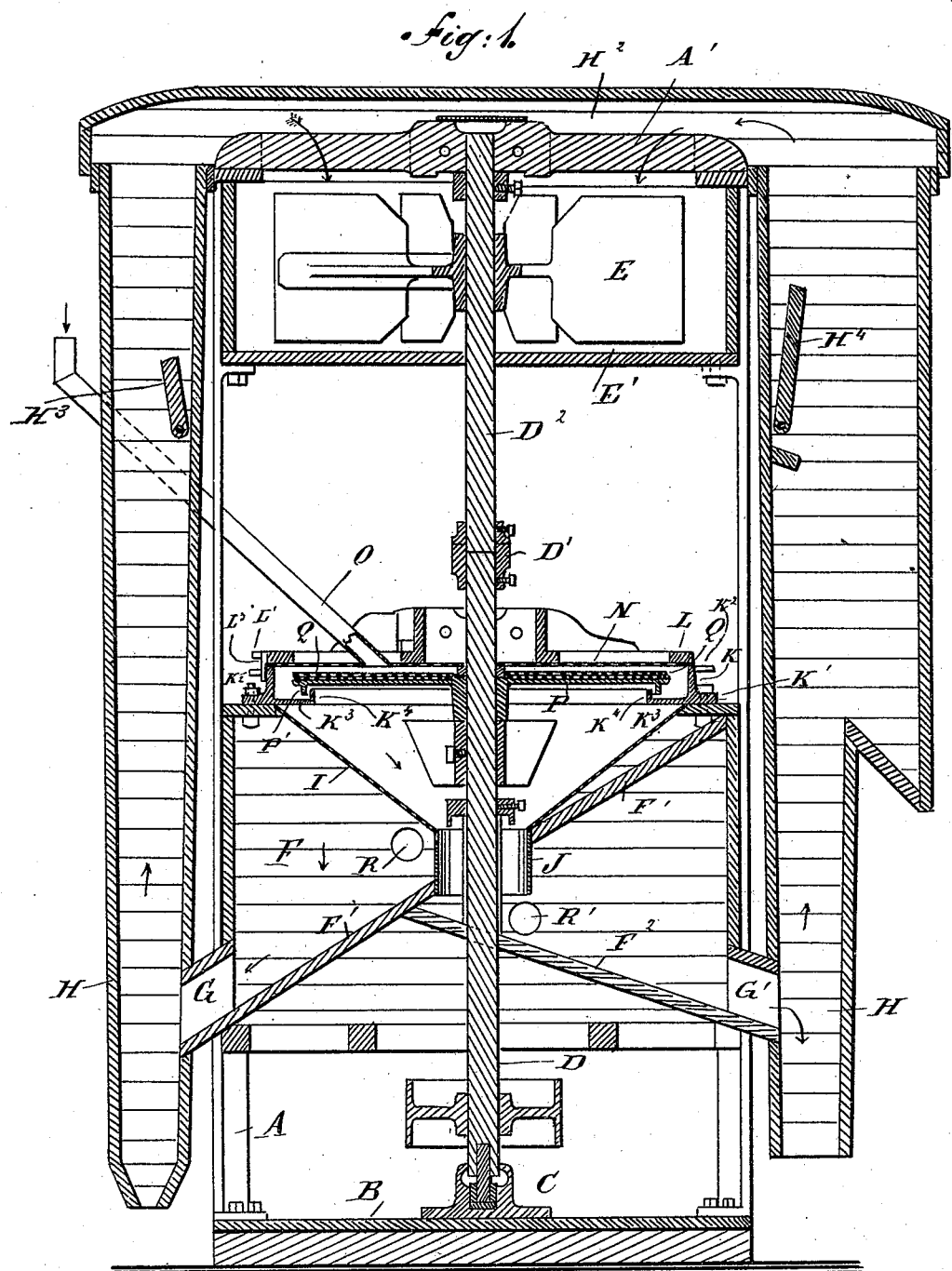

(No Model.) 2 Sheets—Sheet 1.

P. PROVOST.
GRAIN SCOURING MACHINE.

No. 504,173. Patented Aug. 29, 1893.

WITNESSES: Chas. Nider, C. M. Clark

INVENTOR Peter Provost
BY Munn & Co
ATTORNEYS.

(No Model.)
P. PROVOST.
GRAIN SCOURING MACHINE.
No. 504,173. Patented Aug. 29, 1893.
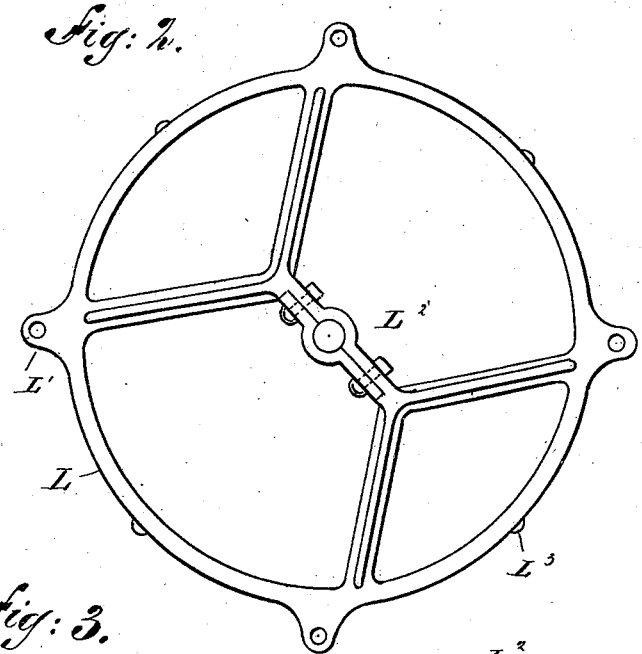
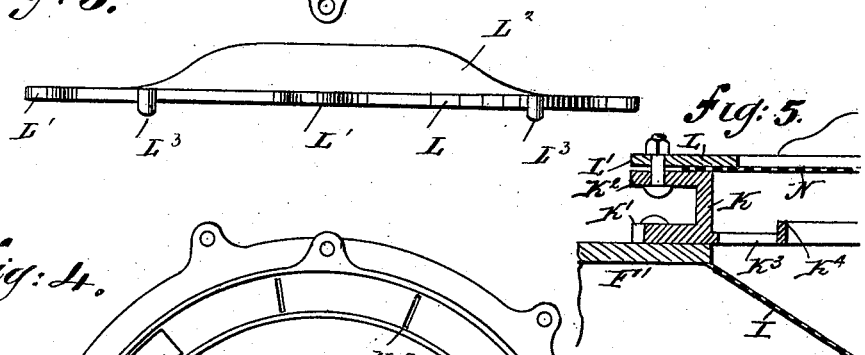
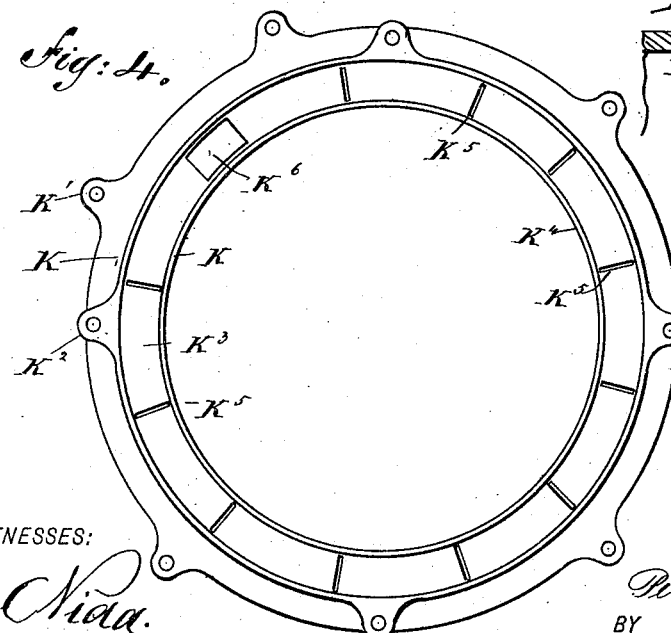
WITNESSES:
Chas Nida
E. M. Clark
INVENTOR
Peter Provost
BY
Munn & Co
ATTORNEYS.

UNITED STATES PATENT OFFICE.

PETER PROVOST, OF MENOMINEE, MICHIGAN.

GRAIN-SCOURING MACHINE.

SPECIFICATION forming part of Letters Patent No. 504,173, dated August 29, 1893.

Application filed August 20, 1892. Serial No. 443,637. (No model.)

*To all whom it may concern:*

Be it known that I, PETER PROVOST, of Menominee, in the county of Menominee and State of Michigan, have invented a new and Improved Grain-Scouring Machine, of which the following is a full, clear, and exact description.

The invention relates to grain scouring machines such as shown and described in Letters Patent of the United States Nos. 398,538, 439,555, and 457,795, granted to me February 26, 1889, October 25, 1890, and August 18, 1819, respectively.

The object of the invention is to provide a new and improved grain scouring machine which is simple and durable in construction, scours the grain perfectly, and removes all impurities.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a longitudinal vertical section of the improvement. Fig. 2 is a plan view of the top part of the casing. Fig. 3 is a side elevation of the same. Fig. 4 is a plan view of the casing ring, and Fig. 5 is a detail sectional view.

The improved grain scouring machine is provided with a suitably constructed frame A, carrying on its base B a step C, in which is journaled the lower end of the main driving shaft D, arranged vertically and coupled by a coupling D' with a second shaft $D^2$ journaled at its upper end in a cross beam A' of the frame A. On this upper shaft $D^2$ is secured a suction fan E arranged within a suitable casing E' supported on the frame A and provided with an outlet spout for carrying off impurities collected from the machine, as hereinafter more fully described.

In the lower part of the frame A is arranged a casing F, provided with a transversely extending inclined partition F', discharging at its lower end, through one side of the casing F, into a chute G leading to the suction channel H extending upward and discharging at its upper end into the top of the casing E' of the suction fan E. A second partition $F^2$ is arranged under the partition F' within the casing F, and over this partition passes the grain through a chute G' into a second channel H', also leading at its upper end to the casing E' containing the fan E. The lower end of the channel H is contracted, as is plainly shown in Fig. 1, so that the air passing into the said channel is limited, and considerable draft is created within the casing F above the partition F'. The other suction channel H' is open at its lower end for the discharge of the scoured and polished grain to the outside of the machine. The upper ends of the channels H and H' are connected with each other by a cross channel $H^2$, which discharges into the top of the casing E', as above mentioned. In the channels are suitable valves $H^3$ and $H^4$ for regulating the suction of the fan E.

On the top of the casing F is secured a conical sieve I, extending above the partition F' and connected at its lower end with a circular chute J arranged concentric with the shaft D and held in the partition F'. The lower end of this chute J discharges upon the upper end of the partition $F^2$, so that the grain can pass down the latter, as above described, to the outside of the machine. On the top of the casing F is arranged a ring K provided with outwardly extending lugs K' bolted or otherwise secured to the top of the said casing F. A second set of lugs $K^2$ is formed near the upper end of the ring K, and support or engage like lugs L' formed on a ring L bolted through the lugs to the said ring K. A spider $L^2$ is arranged in this ring L and forms a bearing for the upper part of the shaft D. On the under side of the ring L is secured a wire disk N formed with an opening for the passage of the grain to be scoured, said grain passing through an inlet spout O leading to said opening, as clearly shown in Fig. 1. The ring K is formed with an inwardly extending annular flange $K^3$ formed at its inner edge with an upwardly extending annular flange $K^4$, so as to form an annular groove for the passage of the grain, the latter passing over the scouring disk Q located below the disk N and secured on a disk P attached to the shaft D, so as to rotate with the same. The scouring disk Q is preferably made of a woven wire disk made in two courses and fastened by a suitable mechanism to the solid disk P. On the under side of the latter is formed an annular projection P' extending into the circular groove formed by the flanges K³ and K⁴ of the ring K. On the horizontally extending flange K³ is formed a series of radial slots K⁵ for the passage of the grain to the conical sieve I, and in the said flange is also formed a side opening K⁶ for permitting a large amount of grain to pass into the sieve I at a time.

In order to securely hold the ring L in place, I provide the latter with downwardly extending projections L³ fitting on the outside of the ring K.

In the front and rear of the casing F are arranged apertures R and R', of which the former serves to admit air to the casing underneath the conical sieve I, so as to loosen any impurities adhering to the sieve. In a like manner the other aperture R' serves to loosen any impurities lodging in that part of the casing inclosed by the partitions F' and F², so that all the impurities within the machine are constantly removed by the action of the suction fan E.

The operation is as follows: When the shaft D is rotated then the scouring disks Q and P revolve with the shaft, and at the same time the suction fan E is actuated to create a draft within the casing F. The grain to be scoured and polished is passed through the inlet chute O and between the disks N and Q, so that the action of the revolving disk rubs the grain against the disk N and at the same time the suction of the fan within the casing causes a loosening and removal of the impurities, which latter, together with the grain, pass over the edge of the disk Q into the annular groove formed by the flanges K³ and K⁴, from which they pass down through the slots K⁵ and opening K⁶ into the conical sieve I, and from the latter through the hopper J, over the partition F² to the chute G' and channel H' in which latter the impurities are scooped up, while the grain flows down outside of the machine. Part of the impurities pass through the conical sieve I upon the inclined partition F', and from the latter through the chute G into the channel H, to finally be discharged by the suction fan E, as previously described.

It will be seen that this machine is very simple and durable in construction, and the grain is very rapidly and thoroughly polished and scoured, and separated from the impurities removed from the grain during the scouring and polishing.

Having thus fully described my invention, I claim as new and desire to secure by Letters Patent—

1. In a grain scouring machine, the combination with a casing, and a conical sieve carried thereby, of an annular groove or trough extending over the sieve, and having openings in its bottom, a revolving scouring disk projecting over and discharging into said groove or trough, and a stationary scouring disk above the revolving disk and through which the grain is discharged upon the revolving disk, substantially as described.

2. In a grain scouring machine, the combination with a revolving disk carrying a woven wire scouring disk, of a ring provided with annular interior flanges forming a groove into which discharges the said scouring disk, the flanges being formed with slots and openings for the passage of the grain, a fixed wire disk supported on the top of the said ring, and a second ring bolted to the first-named ring and carrying the said second wire disk, substantially as shown and described.

3. In a grain scouring machine, the combination with a revolving disk carrying a woven wire scouring disk, of a ring provided with annular interior flanges forming a groove into which discharges the said scouring disk, the flanges being formed with slots and openings for the passage of the grain, a fixed wire disk supported on the top of the said ring, a second ring bolted to the first-named ring and carrying the said second wire disk, and downwardly extending projections arranged on the said second ring to engage the first-named ring, substantially as shown and described.

4. In a grain scouring machine, the combination with the ring K provided with the annular interior flanges K³ and K⁴, of which the flange K³ is provided with the slots K⁵ and the opening K⁶, of the ring L bolted to the ring K and provided with a spider L², lugs L³ projecting from the said ring, and a scouring disk N made of woven wire and secured on the under side of the said ring, substantially as shown and described.

5. In a grain scouring machine, the combination with the ring K provided with the annular interior flanges K³ and K⁴, of which the flange K³ is provided with the slots K⁵ and the opening K⁶, of the ring L bolted to the ring K and provided with a spider L², lugs L³ projecting from the said ring, a scouring disk N made of woven wire and secured on the under side of the said ring, and a solid disk P carrying the woven wire disk Q located below the disk N and the annular flange P' projecting from the under side of the said disk P, substantially as shown and described.

PETER PROVOST.

Witnesses:
B. S. WAITE,
W. H. BALL.